Patented May 16, 1944

2,348,917

UNITED STATES PATENT OFFICE 2,348,917

PROCESS FOR THE MANUFACTURE OF MERCAPTOTHIAZOLINES

Roger A. Mathes, Akron, Ohio, assignor to The B. F. Goodrich Company, New York, N. Y., a corporation of New York No Drawing. Application October 4, 1940, Serial No. 359,729

6 Claims. (Cl. 260—302)

This invention relates to an improved process for the manufacture of certain heterocyclic compounds and has particular reference to the preparation of mercaptothiazolines. These compounds are of value as accelerators for the vulcanization of rubber.

An object of the invention is to provide a process for the manufacture of mercaptothiazolines which is adapted to economical commercial production. A further object is to provide a simple, easily controlled process whereby mercaptothiazolines may be prepared in high yields.

These objects are attained by making use of a new type of reaction in which a cyclic alkyleneimine and carbon disulfide are reacted in the presence of a caustic alkali to form a mercaptothiazoline.

According to a preferred embodiment of my invention, ethyleneimine and carbondisulfide are heated together in the presence of a caustic alkali. The following equation represents the reaction as it is believed to take place.

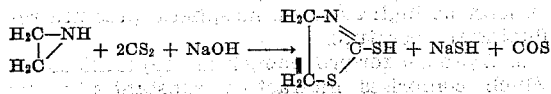

A method described in the literature provides for reacting ethyleneimine and carbon disulfide in the presence of ether. The chief product of this reaction, a yellow oil, upon further treatment yields a small amount of 2-mercaptothiazoline. I have discovered that remarkably improved results are obtained when the reaction is carried out in the presence of aqueous caustic alkali. Under such conditions, the low yield obtained in the described method is increased to 90% of 2-mercaptothiazoline of high purity. This unexpected result is due to the fact that in the presence of caustic alkali essentially all of the ethyleneimine present reacts to form 2-mercaptothiazoline. In the absence of caustic alkali, the usual reaction is for two molecular proportions of ethyleneimine to react with one molecular proportion of carbon disulfide to form a yellow oil. This oil is believed to be an ester, 2-aminoethylthiazolinyl sulfide. This compound is stable and does not decompose to form 2-mercaptothiazoline. When ethyleneimine is slowly added to an excess of carbon disulfide in certain organic solvents, a reaction in equi-molecular proportions occurs. The product of such a reaction is an unstable solid which is not 2-mercaptothiazoline.

My process is not limited to the preparation of mercaptothiazoline itself but includes the preparation of like compounds containing the five membered thiazoline ring and represented by the following formula

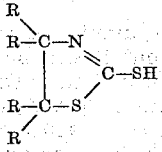

as well as the preparation of the six membered penthiazoline ring, as shown by the following formula.

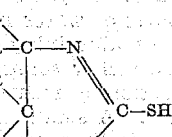

R in each case represents like or unlike radicals which may be hydrogen or hydrocarbon groups such as alkyl, aryl, cycloalkyl, aralkyl, etc. Water is a very sattisfactory reaction diluent from which the mercapto bodies formed are readily recovered because of their low water solubility. An organic solvent such as alcohol may also be employed. The recovery of the product is somewhat more involved where an organic solvent is used.

In addition to ethyleneimine, C-alkylated or arylated cyclic alkyleneimines may be employed in my process. Examples of such imines are methyl ethyleneimine, ethyl ethyleneimine, amyl ethyleneimine, 2-methyl 3-phenylethyleneimine, 2,2-dimethyl ethyleneimine, 2,3-dimethylethyleneimine, 2,2-diphenylethyleneimine, tolyl ethyleneimine, 2,3-diphenylethyleneimine, and trimethyleneimine as well as its C-alkylated or arylated derivatives.

The reaction is preferably carried out in a reactor provided with an agitator, a reflux condenser and a device for varying the temperature of the reaction mixture such as a jacket for circulating steam or cold water.

One molecular proportion of caustic alkali such as sodium or potassium hydroxide is dissolved in water, a ten percent solution being a convenient concentration for the reaction. Two molecular proportions of carbon disulfide are added. While agitating vigorously, a concentrated solution of one molecular proportion of ethyleneimine is slowly added, cooling usually being necessary to maintain a temperature of about 30° C. When the addition of the imine has been completed, the reaction mixture is allowed to reflux gently until the carbon disulfide has all been consumed. The temperature is then increased to 100° C., and refluxing continued until the reaction is complete, usually from one to three hours. After cooling, the solution often contains crystals of 2-mercaptothiazoline. The reaction mixture is acidified as for example with hydrochloric acid or sulfuric acid, whereupon the product is precipitated. The 2-mercaptothiazoline is filtered off, washed and dried at room temperature.

A small amount of wetting or dispersing agent is helpful in improving the dispersion of carbon disulfide in aqueous caustic alkali. Yields are much lower when less than two molecular proportions of carbon disulfide are used. The amount of caustic alkali may be increased to as much as three molecular proportions without much effect upon the yield, although there is no advantage in using more than one molecular proportion.

The following example describes the process more specifically but it will be understood that the invention is not limited to these details.

*Example.*—40 parts by weight of sodium hydroxide are dissolved in 400 parts of water in a reaction vessel provided with an agitator, a thermometer, and a reflux condenser. 168 parts of carbon disulfide are added. With vigorous agitation, a solution of 43 parts of ethyleneimine dissolved in 50 parts of water is added in a very slow stream, while maintaining a temperature of about 30° C. The yellow solution obtained as a result of the reaction is refluxed for one hour and is then cooled. A small amount of 2-mercaptothiazoline crystallizes out at this time. The reaction mixture is neutralized with hydrochloric acid whereupon the product is precipitated. The 2-mercaptothiazoline is filtered off, washed and dried at room temperature. The dry weight is 107.6 parts representing a 90.4% yield. The melting point is 100–103° C.

From the data herein presented, the fact will be readily apparent that this invention constitutes an economical method for producing mercaptothiazolines.

The process according to this invention is quite distinct from a previously described method in that my process is carried out in the presence of caustic alkali. Caustic alkali influences the reaction in a manner such that the cyclic alkyleneimine is converted almost quantitatively to a mercaptothiazoline. A similar reaction in the absence of alkali produces only low yields of mercaptothiazolines, the chief product being presumably 2-amino-ethyl thiazolinyl sulfide. My process may be carried out in standard equipment, requires but a short reaction period and is easily controlled. As the reaction is carried out in water, inorganic salts formed during the reaction and as a result of the neutralization, are eliminated with the filtrate.

I claim:

1. A process for producing a heterocyclic mercapto compound embodying a ring consisting of from three to four carbon atoms, one nitrogen atom and one sulfur atom, one carbon atom of said ring being directly between the nitrogen and sulfur atoms and joined to the sulfur of the non-nuclear mercapto group, which comprises interacting one molecular proportion of a free, three to four membered, cyclic, alkylene imine and substantially two molecular proportions of carbon disulfide in the presence of at least one molecular proportion of aqueous caustic alkali, and heating the reaction mixture to a temperature at least as high as the atmospheric pressure refluxing temperature.

2. A process for producing a mercaptothiazoline which comprises interacting one molecular proportion of a free, cyclic, ethylene imine and at least two molecular proportions of carbon disulfide in the presence of at least one molecular proportion of aqueous caustic alkali, and heating the reaction mixture to a temperature at least as high as the atmospheric pressure refluxing temperature.

3. A process for producing a mercaptothiazoline which comprises interacting substantially one molecular proportion of a free cyclic, ethylene imine and substantially two molecular proportions of carbon disulfide in the presence of substantially one molecular proportion of aqueous caustic alkali, and heating the reaction mixture at a temperature not less than about 100° C.

4. A process for producing a mercaptothiazoline which comprises interacting substantially one molecular proportion of a free, cyclic, alkylene imine and substantially two molecular proportions of carbon disulfide in the presence of substantially one molecular proportion of aqueous caustic alkali, and heating the reaction mixture at least as high as the atmospheric pressure refluxing temperature.

5. A process for producing 2-mercaptothiazoline which comprises interacting substantially one molecular proportion of free ethylene imine and proportions of carbon disulfide in the presence of at least one molecular proportion of a caustic alkali, and heating the reaction mixture to a temperature at least as high as the atmospheric pressure refluxing temperature.

6. A process for producing 2-mercaptothiazoline which comprises interacting substantially one molecular proportion of free ethylene imine and substantially two molecular proportions of carbon disulfide in the presence of substantially one molecular proportion of aqueous sodium hydroxide and heating the reaction mixture at least as high as the atmospheric pressure refluxing temperature.

ROGER A. MATHES.